Patented Nov. 26, 1929

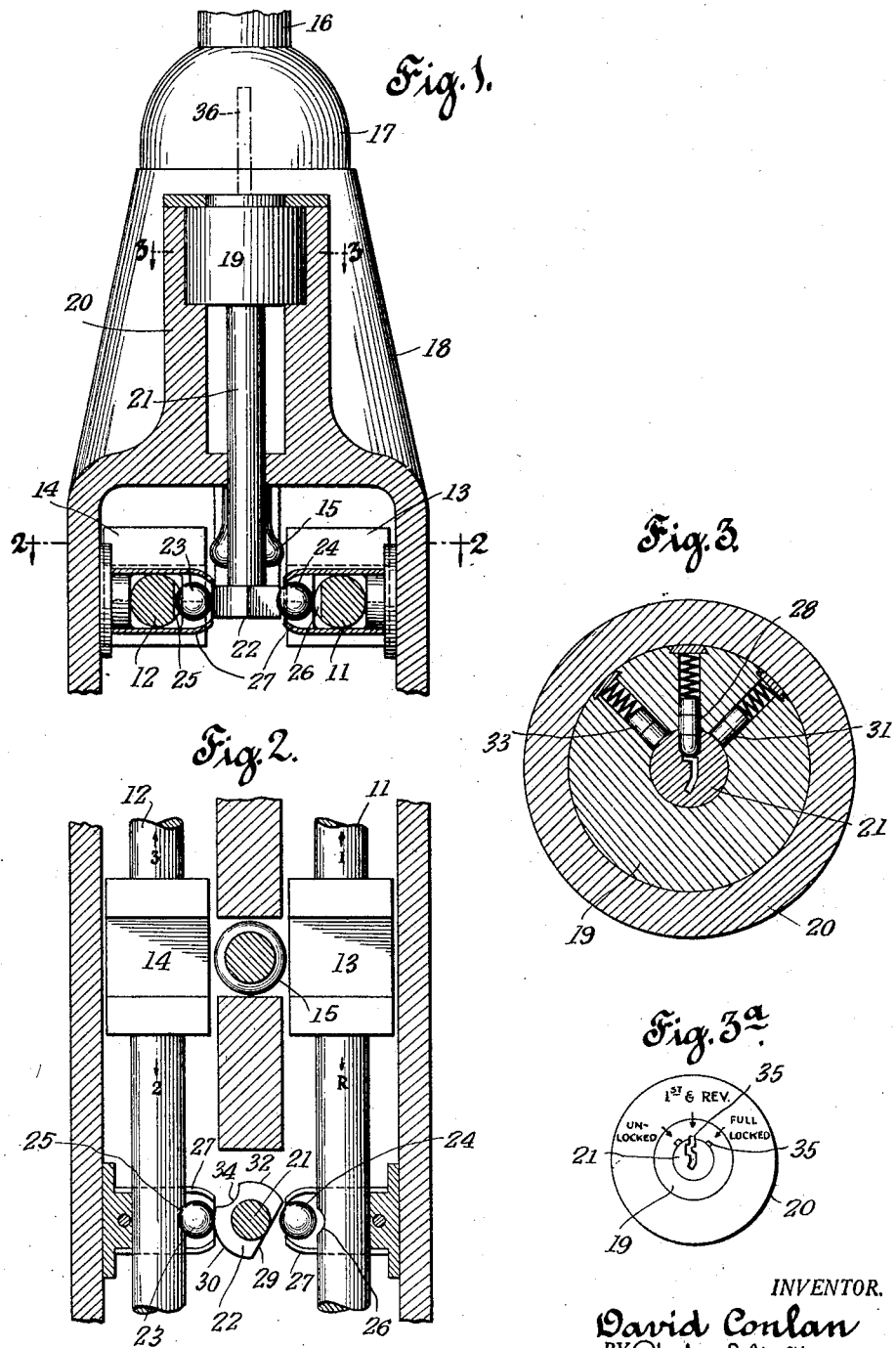

1,737,043

UNITED STATES PATENT OFFICE

DAVID CONLAN, OF BROOKLYN, NEW YORK

MOTOR-VEHICLE LOCK

Application filed March 21, 1928. Serial No. 263,565.

This invention relates to the locking of automobiles and in general, motor driven vehicles.

The objects of the invention are to provide a reliable and practical lock for securing the vehicle against unauthorized use and which also may be employed to secure the vehicle against any other than a predetermined limited, authorized use.

The invention is of particular utility in connection with the storing of automobiles in public garages and comprises in this connection, special means for locking the car against operation in the ordinary driving speeds, but permitting of operation in low speed or in reverse. This meets the requirements of most garages that cars be left so that they may be shifted about or removed in case of fire or other hazard, but prevents the cars being driven out or put to any unauthorized use.

Other special objects and novel features of the invention will appear as the specification proceeds.

The drawing accompanying and forming part of this specification illustrate a practical embodiment of the invention, and it should be understood that the invention may be embodied in other forms than that illustrated, within the intended scope of the following description and claims.

Figure 1 is a broken part vertical sectional view of the upper portion of an automobile variable speed transmission with the new lock incorporated therein.

Figure 2 is a horizontal sectional view of the same as on substantially the plane of line 2—2 of Figure 1.

Figure 3 is an enlarged horizontal sectional view of the lock cylinder as on the plane of line 3—3 of Figure 1.

Figure 3ª is a plan view of the lock structure.

In the form of the invention illustrated herein, the lock mechanism is combined with the gear case of an automobile in such a way that it may be used to lock the automobile either wholly inoperative or so that it may be operated only in low speed and in reverse.

In the standard form of gear shift in use at the present time, the gear shift lever is rocked from a neutral position to the left to effect an engagement with the shifter for first and reverse and is rocked to the right to effect an engagement with the shifter for second and high speed. Consequently, the purposes of the invention can be effected either by locking the parts so that the gear shift lever in the partially locked condition, can pick up only the first and reverse gear shifter, or simply by leaving this gear shifter free and locking the other gear shifter so that it may not be moved.

In the form of the invention illustrated, Figures 1 to 3, the desired partially locked effect is obtained by securing the second slide while leaving the first slide free to be shifted at will. The two gear shift slides are indicated at 11 and 12 mounted to slide in the usual way in the top of the gear case and carrying suitable shifting forks or the like for sliding the gears into and out of mesh. The forks and the gears are not shown as these are sufficiently well known to require no illustration. These slides carry transverse boxes 13, 14 to receive the ball or other suitably shaped lower end portion 15 of the gear shift lever 16. The right-hand slide 10 in Figure 2 is the first speed and reverse shift, forward movement of the same effecting engagement of the gears in low speed and rearward motion effecting meshing of the gears for reverse driving. The other gear shifter serves by rearward and forward movements of the same to effect meshing of the gears for second and third speeds. These selecting and shifting movements are so well known as to require no further description, it being understood that the gear shift lever is suitably swivelled at 17 in the top of the column 18 rising from the gear case so that it may have the necessary lateral and back and forth movements to effect these results.

The locking mechanism in this embodiment consists of a pin tumbler lock cylinder 19 journaled in a suitable bearing 20 on top of the gear case and having a shaft 21 extending down between the slides and there carrying a cam 22 controlling two locking bolts in the form of balls 23, 24, for cooperation with keeper slots or recesses 25, 26 in the adjoining sides of the shifters. These balls are shown as loosely confined to the slides in guides 27 and the cam is shown as positioned and shaped so as to either force these balls into locking engagement with the slides or to release them so that they will permit the slides to freely operate.

In the position of the parts shown in Figures 2, 3 and 3ª, the locking shoulder is in an intermediate position, secured there by the center set of pin tumblers 28 and the cam likewise is in an intermediate position, in which the recessed or "flattened" side 29 of the cam leaves the ball 24 free of the first and reverse slide 11 and a rounded or raised portion 30 of the cam holds the other ball 23 in position locking the second and third speed slide against movement. Thus in this condition of the parts, the gear shift lever is effective to shift only the first and reverse slide, the other slide being positively held against gear shifting movement in either direction.

By turning the lock a further step to the right in Figures 2, 3 and 3ª, that is, so as to bring the pin tumblers 31 into use, the raised shoulder 32 of the cam is swung around so as to thrust the ball 24 into locking engagement with the first slide. In this position the elongated shoulder 30 will still be in holding engagement with the locking ball 23 and therefore both slides will be positively locked.

In the unlocked relation, with the cylinder turned to the left far enough to bring the pin tumblers 33 into use, both balls will be released, the relief or flat 29 at one side of the cam releasing ball 24 and a notch 34 in the opposite sides of the cam releasing the ball 23, leaving both slides free for operation. The lock is made with notches 35 for these three positions so that the key which is indicated at 36 in Figure 1 may be withdrawn when the lock is in the unlocked condition turned to the left, in the intermediate or partial locking condition or in the fully locked condition.

What is claimed is:

1. In combination with a motor vehicle transmission including a first speed and reverse slide and a second and third speed slide, arranged in side by side relation and a gear shift lever having lateral and longitudinal movements for picking up one slide or the other and for shifting the selected slide, locking bolts for securing the two slides, a cam positioned between said locking bolts, said cam being rotatably mounted and provided with locking means by which it may be secured in any one of three positions and said cam having a contour for releasing both locking bolts from the slides in one position of the cam, a portion to hold only the locking bolt for the second and third speed slide in locking engagement with the slide in a second position of the lock and portions to hold both the locking bolts in locking engagement with both the slides in a third position of the lock.

2. In combination with a motor vehicle transmission, including gear shifters arranged in side by side relation and a shift lever mounted for universal movements to enable the selective engagement with and operation of either gear shifter, a three position lock and cam mechanism controlled thereby and associated with said gear shifters to free both gear shifters in one position of the lock, to secure one of the gear shifters and free the other gear shifter in a second position of the lock and to secure both the gear shifters in the third position of the lock.

3. In combination with a motor vehicle transmission, including gear shifters and a shift lever operable to selectively engage and actuate either of said gear shifters, a key actuated lock having one unlocking and two locking positions, locking bolt mechanism for securing the shifters and means controlling said locking bolt mechanism and operable in said three positions of the lock to leave both gear shifters free for operation by the shift lever, or to free only one gear shifter and secure the other, or to secure both gear shifters.

4. In combination with a variable speed transmission having reverse and three forward speeds, a lock having one unlocking and two locking positions and gear shift locking mechanism controlled by said lock and operable in the unlocking position of the lock to permit free shifting of the gears and in one of the locking positions to lock the second and high speed gearing and leave the low speed and reverse gearing free for use and in the other locking position to lock the reverse and all forward speed gearing.

5. In combination with a variable speed transmission having reverse and three forward speeds and including a gear shifter for reverse and first speed, a gear shifter for second and third speeds and a shift lever for selective actuation of said gear shifters and locking means having one unlocking and two locking positions, one locking position in which the second and high speed gearing is locked while the reverse and first speed gearing is free for use and a second locking position in which the reverse and all forward speeds are locked.

6. In combination, a motor vehicle selective speed transmission including gear shift slides in side by side substantially parallel relation and arranged in substantially the same horizontal plane, one of said slides controlling the reverse and first speed and the second slide controlling the second and third speed, a lever for operating said slides, locking means having an unlocking position permitting free operation of either slide by the lever and two locking positions, a first locking position in which operation of the second and high speed shift slide is prevented while the reverse and first speed slide is free for use and a second locking position in which operation of both slides is prevented.

7. In combination with a variable speed transmission including gear shifters arranged in side by side relation and having in the neutral relation sockets opposed to receive the actuating end of a gear shift lever, bolts for locking one or both the slides, a cam positioned between said bolts having a shoulder for thrusting one bolt into locking engagement with one slide and a cutaway portion opposite for releasing the other bolt from locking engagement with the other slide, opposed shoulder portions for holding both locking bolts interlocked with the slides in a second position of the cam and a cutaway portion opposite a portion of the first cutaway portion to release both locking bolts in a third position of the cam and lock mechanism for selectively securing the cam in either of the two locking positions aforesaid.

8. In combination with a motor vehicle, variable speed transmission having a reverse and several forward speeds, locking mechanism for said transmission, said locking mechanism having one unlocking position to free the transmission for use of the reverse and the several forward speeds and having two locking positions, one locking position to free the transmission for use of the reverse and one forward speed while securing the transmission against use of all other forward speeds and a second locking position to secure the transmission against use of the reverse and all forward speeds and key actuated lock means for unlocking said locking mechanism and for selectively shifting and securing said locking mechanism in either of the said two locking positions with the transmission either free for operation only in the reverse and one forward speed or locked against use in reverse and all forward speeds.

In testimony whereof I affix my signature.

DAVID CONLAN.